(12) United States Patent
Fujita et al.

(10) Patent No.: US 10,754,210 B1
(45) Date of Patent: Aug. 25, 2020

(54) DISPLAY DEVICE

(71) Applicant: SHARP KABUSHIKI KAISHA, Sakai, Osaka (JP)

(72) Inventors: Tetsuo Fujita, Sakai (JP); Yoshimasa Chikama, Sakai (JP); Yoshihito Hara, Sakai (JP); Yukinobu Nakata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 107 days.

(21) Appl. No.: 16/313,147

(22) PCT Filed: Jun. 27, 2017

(86) PCT No.: PCT/JP2017/023569
§ 371 (c)(1),
(2) Date: Dec. 25, 2018

(87) PCT Pub. No.: WO2018/003795
PCT Pub. Date: Jan. 4, 2018

(30) Foreign Application Priority Data

Jun. 27, 2016 (JP) .................................. 2016-126665

(51) Int. Cl.
*G02F 1/1345* (2006.01)
*G02F 1/1362* (2006.01)
*G02F 1/1333* (2006.01)

(52) U.S. Cl.
CPC ........ *G02F 1/1345* (2013.01); *G02F 1/13452* (2013.01); *G02F 1/13458* (2013.01); *G02F 1/133345* (2013.01); *G02F 1/136286* (2013.01)

(58) Field of Classification Search
CPC .............. G02F 1/1345; G02F 1/13452; G02F 1/13458; G02F 1/136286; G02F 1/133345
See application file for complete search history.

(56) References Cited

U.S. PATENT DOCUMENTS 10,311,814 B2 * 6/2019 Dong .................. G02F 1/13452
2002/0071086 A1 * 6/2002 Kim .................... G02F 1/13458
349/152

(Continued)

FOREIGN PATENT DOCUMENTS

JP 2006-209089 A 8/2006
JP 2006-220832 A 8/2006

(Continued)

*Primary Examiner* — Jessica M Merlin
(74) *Attorney, Agent, or Firm* — ScienBiziP, P.C.

(57) ABSTRACT

A display device according to an aspect of the present invention includes a plurality of connection terminals and a plurality of lead lines, and the plurality of lead lines includes first lead lines, second lead lines, and third lead lines. Signal-line-side first lead lines are formed of a first conductive layer, signal-line-side second lead lines are formed of a second conductive layer, and signal-line-side third lead lines are formed of a third conductive layer. A lowest conductive layer of each switching element is formed of the second conductive layer. Among the plurality of lead lines, the connection-terminal-side first lead lines, the connection-terminal-side second lead lines, and the connection-terminal-side third lead lines are formed of conductive layers that include at least the third conductive layer but do not include the first conductive layer.

6 Claims, 18 Drawing Sheets

(56) References Cited

U.S. PATENT DOCUMENTS

2006/0139551 A1    6/2006  Kimura
2009/0121227 A1    5/2009  Itoh et al.
2014/0176886 A1    6/2014  Yoshida

FOREIGN PATENT DOCUMENTS

JP        2006220832 A  *  8/2006
JP        2009-122244 A    6/2009
WO        2013/021866 A1   2/2013

* cited by examiner

DISPLAY DEVICE

TECHNICAL FIELD

An aspect of the present invention relates to a display device.

The present application claims priority based on Japanese Patent Application No. 2016-126665, filed in Japan on Jun. 27, 2016, the content of which is incorporated herein by reference.

BACKGROUND ART

Recent display devices have been progressing in terms of displaying images with enhanced resolution, and there is a trend of an increased number of signal lines on a substrate of such recent display devices compared with display devices of the related art. In a display device where a semiconductor chip for a driver is mounted on a substrate, lead lines for leading signal lines out to connection terminals connected to the semiconductor chip are provided in a peripheral region surrounding a display region. Further, in the recent display devices, it is desired that the peripheral region (also referred to as picture-frame region) be reduced in width (namely, the picture-frame region be narrowed). However, because the number of lead lines increases with an increase in the number of signal lines, a large space may be required to arrange the lead lines, which may result in an increased area of the picture-frame region.

Patent Literature 1 described below discloses a display device that includes first gate lead lines, second gate lead lines, and third gate lead lines. In the display device described in Patent Literature 1, the first gate lead lines are formed on a base substrate, the second gate lead lines are formed on a gate insulating layer, and the third gate lead lines are formed on a first passivation film.

CITATION LIST

Patent Literature

PTL 1: International Publication No. 2013/021866

SUMMARY OF INVENTION

Technical Problem

In the display device described in Patent Literature 1, since the third gate lead lines are formed on the first passivation film, the lead lines are located at positions extremely close to a liquid crystal layer as viewed in a sectional view of the display device. Thus, an unintended voltage may sometimes be applied to the liquid crystal layer, or parasitic capacitance may sometimes be generated between the lead lines and gate lines, source lines, pixel electrodes, and the like. Due to such undesirable effects, there can arise a problem of display quality undesirably deteriorating.

In view of the aforementioned problem, an aspect of the present invention seeks to provide, as an object of the invention, a display device in which a picture-frame region may be narrowed while deterioration of display quality is suppressed.

Solution to Problem

In order to accomplish the aforementioned object, a display device according to an aspect of the present invention includes: a first substrate; an electro-optical material layer provided on a first surface of the first substrate; a plurality of signal lines provided on the first surface; a plurality of switching elements provided on the first surface; a plurality of connection terminals provided on the first surface; and a plurality of lead lines extending in a first direction along the first surface and electrically connecting at least some of the plurality of signal lines and at least some of the plurality of connection terminals. The plurality of lead lines include a first lead line, a second lead line, and a third line that are arranged sequentially in a second direction perpendicular to the first direction in plan view as viewed in a direction normal to the first surface. The first lead line includes a signal-line-side first lead line connected at one end to one of the signal lines, and a connection-terminal-side first lead line connected at one end to the signal-line-side first lead line and connected at another end to one of the connection terminals. The second lead line includes a signal-line-side second lead line connected at one end to another one of the signal lines, and a connection-terminal-side second lead line connected at one end to the signal-line-side second lead line and connected at another end to another one of the connection terminals. The third lead line includes a signal-line-side third lead line connected at one end to another one of the signal lines, and a connection-terminal-side third line connected at one end to the signal-line-side third lead line and connected at another end to another one of the connection terminals. The signal-line-side first lead line is formed of a first conductive layer provided on the first surface, the signal-line-side second lead line is formed of a second conductive layer provided on a first insulating layer covering the first lead line, and the signal-line-side third lead line is formed of a third conductive layer provided on a second insulating layer covering the second lead line. A lowest conductive layer among a plurality of conductive layers forming the switching elements is formed of the second conductive layer. Among the plurality of lead lines, the connection-terminal-side first lead line, the connection-terminal-side second lead line, and the connection-terminal-side third lead line are formed of conductive layers that include at least the third conductive layer but do not include the first conductive layer.

In the display device according to an aspect of the present invention, each of the connection-terminal-side first lead line, the connection-terminal-side second lead line, and the connection-terminal-side third lead line may be formed of the third conductive layer.

In the display device according to an aspect of the present invention, the connection-terminal-side first lead line, the connection-terminal-side second lead line, and the connection-terminal-side third lead line may be constructed such that the second conductive layer and the third conductive layer are arranged alternately across the plurality of lead lines.

In the display device according to an aspect of the present invention, any of the connection terminals connected respectively to the connection-terminal-side first lead line, the connection-terminal-side second lead line, and the connection-terminal-side third lead line may be constructed such that the second conductive layer and the third conductive layer are layered.

In the display device according to an aspect of the present invention, each of the switching elements may be a thin film transistor, the plurality of signal lines may include a plurality of gate lines and a plurality of source lines, and the lead lines may electrically connect the source lines and the connection terminals.

In the display device according to an aspect of the present invention, a gate electrode of the thin film transistor may be formed of the second conductive layer.

Advantageous Effects of Invention

According to an aspect of the present invention, it is possible to provide a liquid crystal display device in which a picture-frame region may be reduced while deterioration of display quality is suppressed, and mounting defects of connection terminals is reduced.

DESCRIPTION OF EMBODIMENTS

First Embodiment

Hereinafter, a first embodiment of the present invention is described with reference to FIGS. 1 to 8.

The present embodiment is described in relation to a case in which a display device according to an aspect of the present invention is applied as a liquid crystal display device. While the liquid crystal display device according to the present embodiment is preferably used as a display for, for example, mobile telephones, portable information terminals, game machines, digital cameras, printers, car navigation systems, intelligent home appliances, and the like, it should be noted that applications of the liquid crystal display device according to the present embodiment are not particularly limited.

(Overall Construction of Liquid Crystal Display Device)

Figure 1:
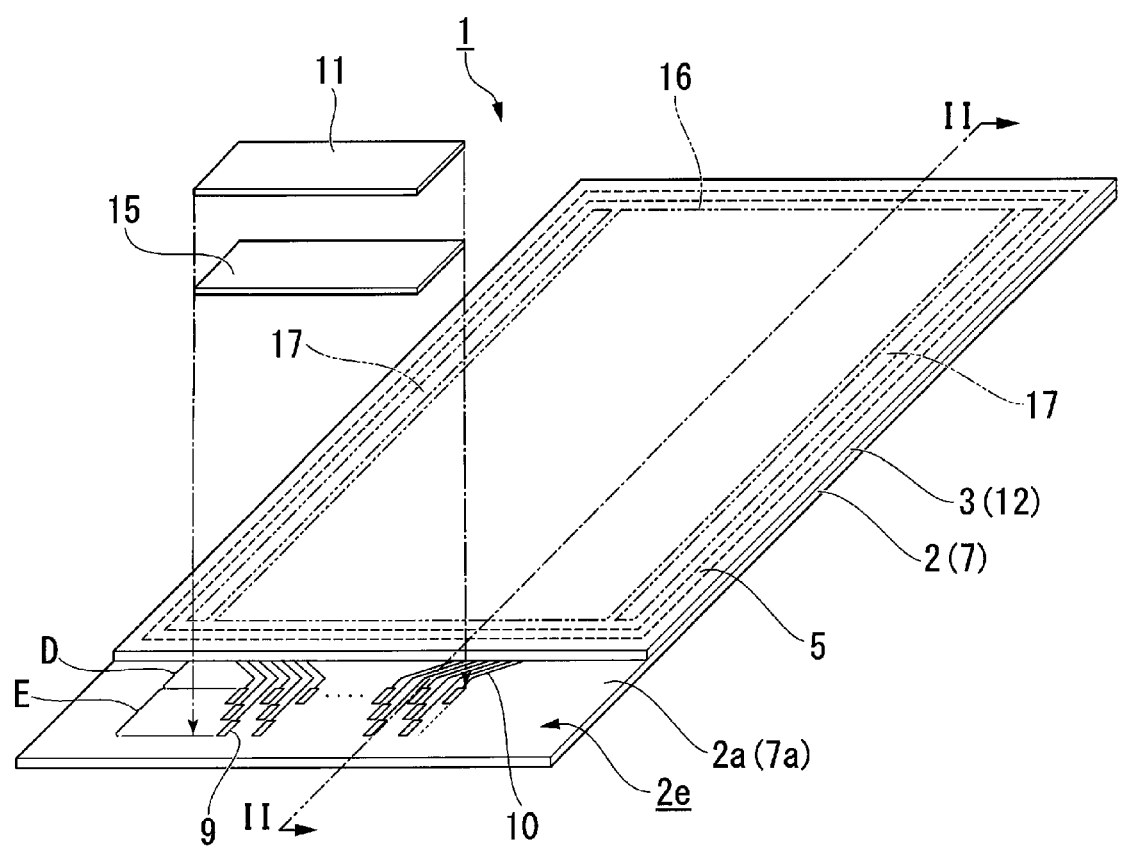
FIG. 1 is a perspective view of a liquid crystal display device according to a first embodiment.
Figure 2:
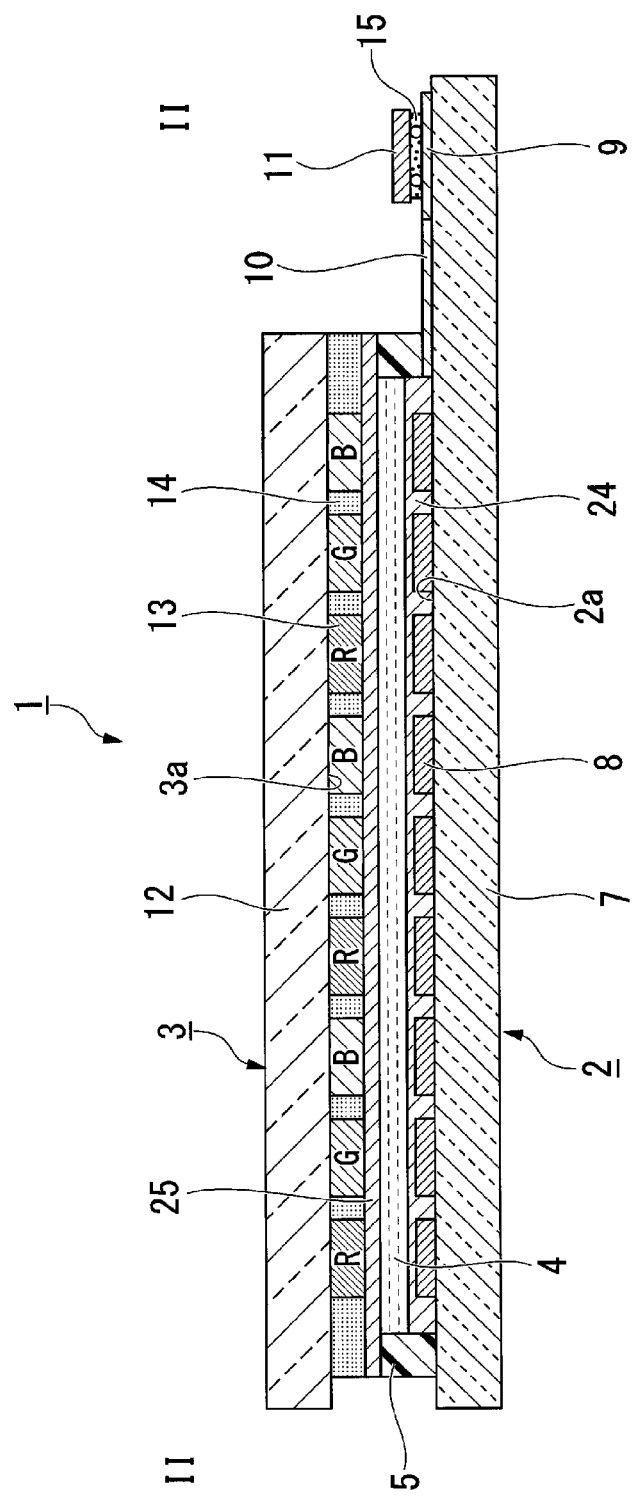
FIG. 2 is a sectional view taken along line II-II of FIG. 1.
Figure 3:
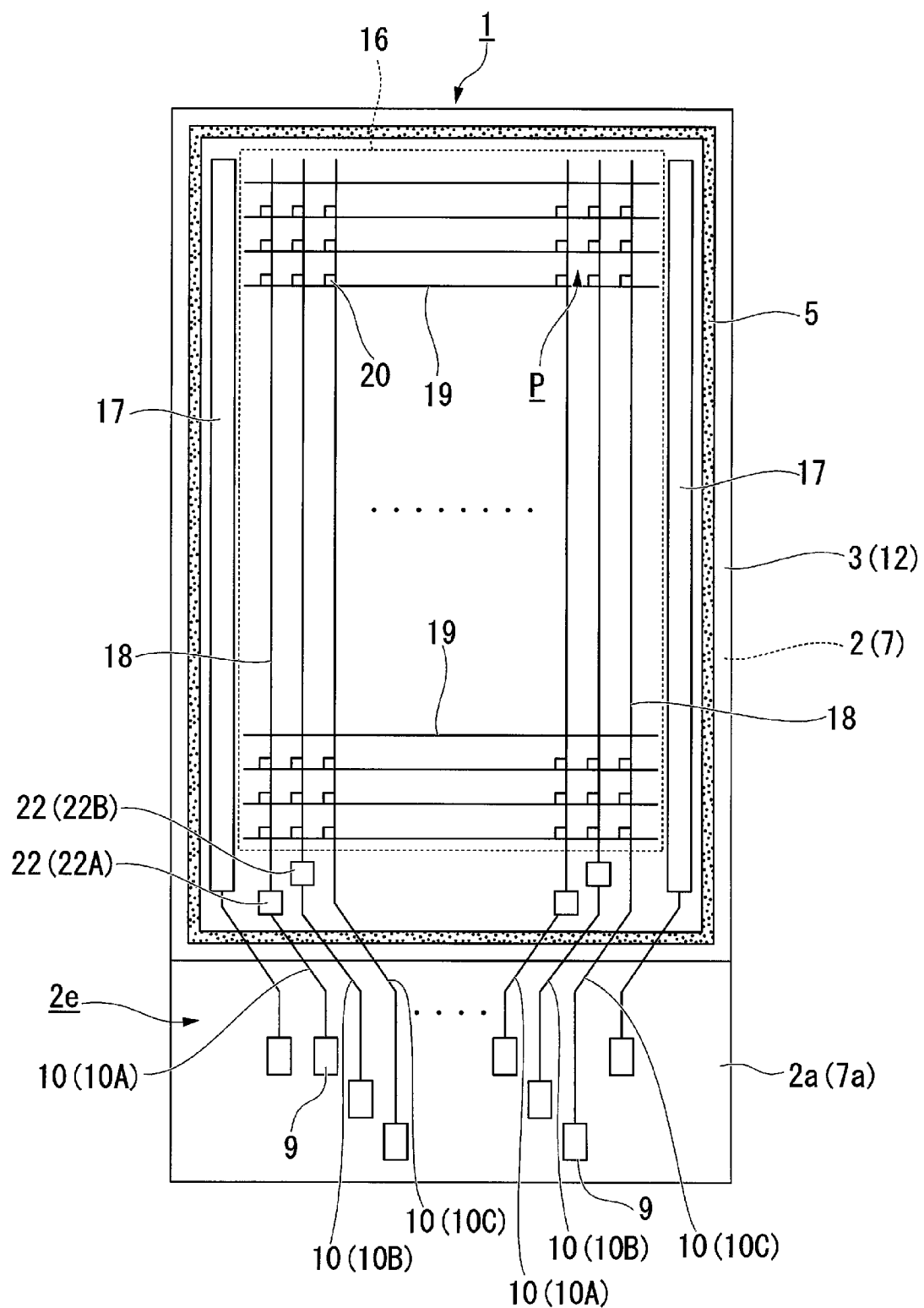
FIG. 3 is a plan view of the liquid crystal display device.

FIG. 1 is a perspective view of the liquid crystal display device according to the present embodiment. FIG. 2 is a sectional view taken along line II-II of FIG. 1. FIG. 3 is a plan view of the liquid crystal display device.

Note that in respective figures to be described below, respective component elements of the liquid crystal display device are illustrated at different dimensional scales as necessary for easier viewing of the component elements.

As illustrated in FIGS. 1 and 2, the liquid crystal display device 1 according to the present embodiment includes an element substrate 2, a counter substrate 3, and a liquid crystal layer 4. The counter substrate 3 is provided opposing a first surface 2a of the element substrate 2. The liquid crystal layer 4 is provided between the element substrate 2 and the counter substrate 3. More specifically, the counter substrate 3 is bonded to the element substrate 2 via a sealing material 5 so as to oppose the first surface 2a of the element substrate 2. The liquid crystal layer 4 is enclosed in a space surrounded by the element substrate 2, the counter substrate 3, and the sealing material 5.

The liquid crystal layer 4 in the present embodiment corresponds to an electro-optical material layer in the claims.

The element substrate 2 generally includes: a first substrate 7; a plurality of thin film transistors (not illustrated in FIGS. 1 and 2); a plurality of source lines and a plurality of gate lines (not illustrated in FIGS. 1 and 2); a common electrode (not illustrated in FIGS. 1 and 2); a plurality of subpixel electrodes 8; a plurality of connection terminals 9; a plurality of lead lines 10; and a semiconductor chip 11 for a driver.

The counter substrate 3 includes a second substrate 12, a color filter 13, and a black matrix 14.

As illustrated in FIG. 3, the element substrate 2 and the counter substrate 3 each have a rectangular shape in plan view as viewed in a direction normal to the substrates. Further, a dimension of the element substrate 2 in a longitudinal direction is larger than a dimension of the counter substrate 3 in the longitudinal direction, and one end portion of the element substrate 2 protrudes outwardly beyond one short side of the counter substrate 3. In the following description, such a portion of the element substrate 2 protruding outwardly beyond the counter substrate 3 is referred to as "a protruding region 2e". For example, a transparent substrate, such as an alkali-free glass substrate, is used as each of the first substrate 7 forming the element substrate 2 and the second substrate 12 forming the counter substrate 3.

The sealing material 5 is provided in a rectangular ring shape along a peripheral edge portion of the counter substrate 3. The sealing material 5 may be formed, for example, of a photo-curable resin or a thermosetting resin. A display region 16 that contributes substantially to display is provided inside a rectangular region surrounded by the sealing material 5. Gate line control circuits 17 are provided in areas between the display region 16 and the sealing material 5 along respective long sides of the counter substrate 3.

A plurality of source lines 18 are provided on a first surface 7a of the first substrate 7. The plurality of source lines 18 are provided parallel to one another at predetermined intervals such that each of the source lines 18 extends in a long-side direction of the first substrate 7. Further, a plurality of gate lines 19 are provided on the first surface 7a of the first substrate 7. The plurality of gate lines 19 are provided parallel to one another at predetermined intervals such that each of the gate lines 19 extends in a short-side direction of the first substrate 7. Thus, the plurality of source lines 18 and the plurality of gate lines 19 perpendicularly intersect each other.

The plurality of source lines 18 and the plurality of gate lines 19 correspond to a plurality of signal lines in the claims.

Each region surrounded by two adjoining source lines 18 and two adjoining gate lines 19 constitutes a subpixel P that is a minimum display unit. A region where a plurality of such subpixels P are disposed in a matrix with a plurality of rows and a plurality of columns corresponds to the display region 16. Each of the subpixels P is provided with a thin film transistor 20 for controlling the electrical potential of a subpixel electrode of the subpixel P. The term thin film transistor is hereinafter abbreviated as TFT. A plurality of such TFTs 20 corresponding in number to the subpixels are provided on the first surface 7a of the first substrate 7. In the liquid crystal display device 1 according to the present embodiment, each pixel is constituted by three subpixels, namely, red (R), green (G), and blue (B) subpixels. Alternatively, however, each pixel may be constituted by four or more subpixels.

The TFTs 20 in the present embodiment correspond to switching elements in the claims.

The plurality of connection terminals 9 are provided on the protruding region 2e of the first surface 2a of the element substrate 2 such that the connection terminals 9 are arranged in the short-side direction of the substrate 2. Further, among the plurality of connection terminals 9, adjoining connection terminals 9 are disposed at positions displaced from each other in the long-side direction of the element substrate 2. Such an arrangement of the connection terminals 9 is preferable for reducing pitch between the lead lines 10, as is described later. Note, however, that the plurality of connection terminals 9 may be disposed at positions not displaced in the long-side direction of the element substrate 2.

As illustrated in FIG. 1, the semiconductor chip 11 for a driver is mounted on the protruding region 2e of the first surface 2a of the element substrate 2. The semiconductor chip 11 for a driver and the plurality of connection terminals 9 are fixed to each other with an anisotropic conductive film 15 in between and electrically connected to each other. The anisotropic conductive film 15 is hereinafter abbreviated as ACF. The semiconductor chip 11 for a driver has a function of a source line control circuit that controls signals to be supplied to the plurality of source lines 18. Individual electrodes (not shown) of the semiconductor chip 11 for a driver are electrically connected to the individual connection terminals 9.

The plurality of lead lines 10 are provided on the first surface 2a of the element substrate 2. Each of the plurality of lead lines 10 electrically connects one of the source lines 18 and one of the connection terminals 9 to each other.

As set forth later, not all of the plurality of lead lines 10 are formed as direct extensions of the source lines 18; some of the lead lines 10 include conductive film layers different from a layer forming the source lines 18. The plurality of lead lines 10 include three types of lead lines, namely, first lead lines 10A, second lead lines 10B, and third lead lines 10C, as described later. These lead lines 10 are provided so as to intersect the sealing material 5.

Figure 4:
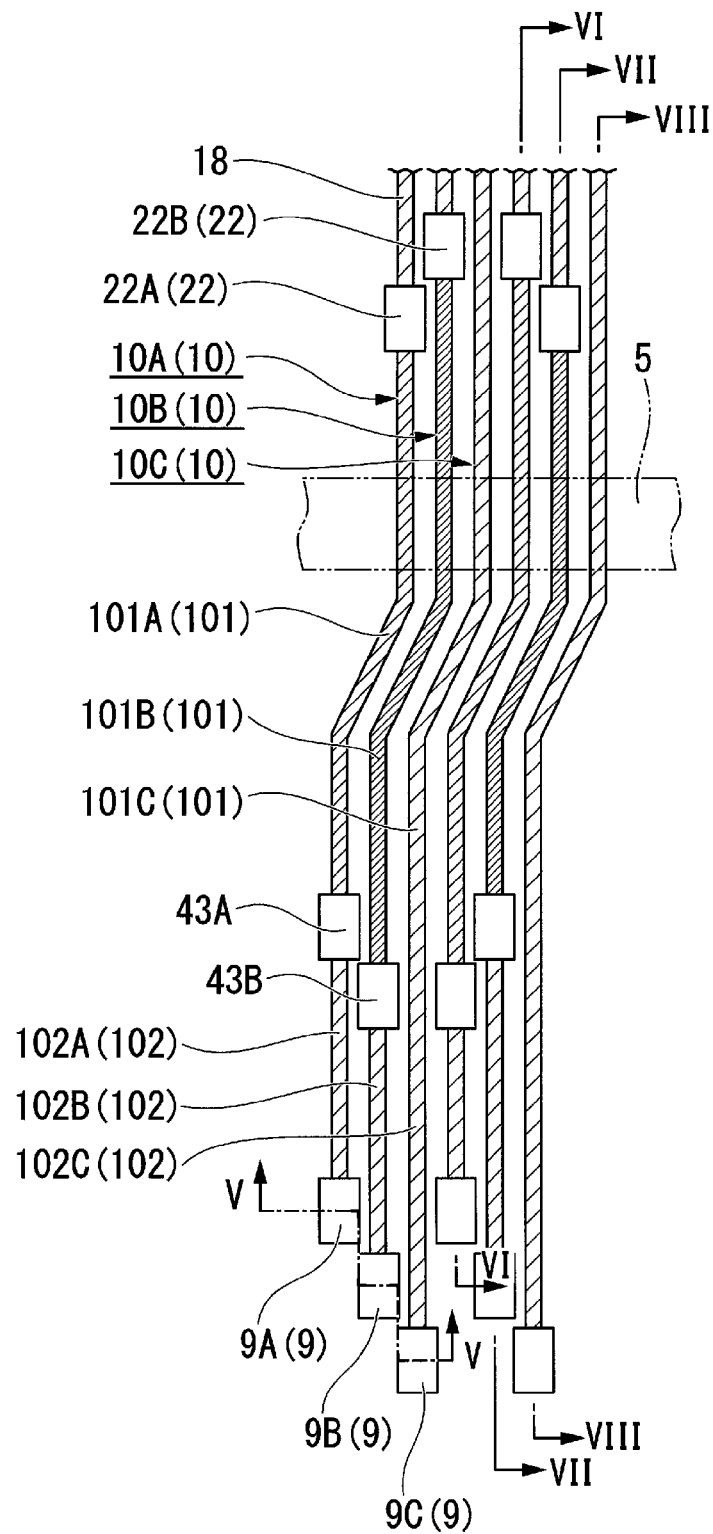
FIG. 4 is an enlarged view illustrating a lead wiring section and a connection terminal section.

FIG. 4 is an enlarged view illustrating a section where the lead lines 10 of FIG. 3 are provided.

As illustrated in FIG. 4, the first lead lines 10A, the second lead lines 10B, and the third lead lines 10C are sequentially arranged repeatedly in a lateral direction of FIG. 4 (namely, in the short-side direction of the element substrate 2). In the example illustrated in FIG. 3, the first lead lines 10A, the second lead lines 10B, and the third lead lines 10C are arranged repeatedly in sequence such as the first lead line 10A, the second lead line 10B, the third lead line 10C, the first lead line 10A, the second lead line 10B, and the third lead line 10C in the left-to-right direction in FIG. 3.

In plan view as viewed in the direction normal to the element substrate 2, the first lead line 10A, the second lead line 10B, and the third lead line 10C do not overlap one another. In other words, gaps or intervals are provided between the first lead line 10A and the second lead line 10B, between the second lead line 10B and the third lead line 10C, and between the third lead line 10C and the first lead line 10A.

A plurality of lead line contact sections 22 are arranged in the short-side direction of the element substrate 2. Adjoining lead line contact sections 22 among the plurality of lead line contact sections 22 are provided at positions displaced from each other in the longitudinal direction of the lead lines 10. The lead line contact sections 22 are provided at contact portions between the first lead lines 10A and the source lines 18 and electrically connect the first lead lines 10A and the source lines 18. Likewise, the lead line contact sections 22 are provided at connecting positions between the second lead lines 10B and the source lines 18 and electrically connect the second lead lines 10B and the source lines 18.

The lead line contact sections 22 connecting the first lead lines 10A and the source lines 18 are hereinafter referred to as "first lead line contact sections 22A". The lead line contact sections 22 connecting the second lead lines 10B and the source lines 18 are hereinafter referred to as "second lead line contact sections 22B". Note that the third lead lines 10C and the source lines 18 are formed integrally of the same conductive layer, and thus, no contact section is provided between the third lead lines 10C and the source lines 18. The plurality of lead line contact sections 22 are disposed inward of the sealing material 5.

Next, sectional constructions of the entire liquid crystal display device 1 and respective sections of the display device 1 are described with reference to FIG. 2 and FIGS. 5 to 8.

Figure 5:
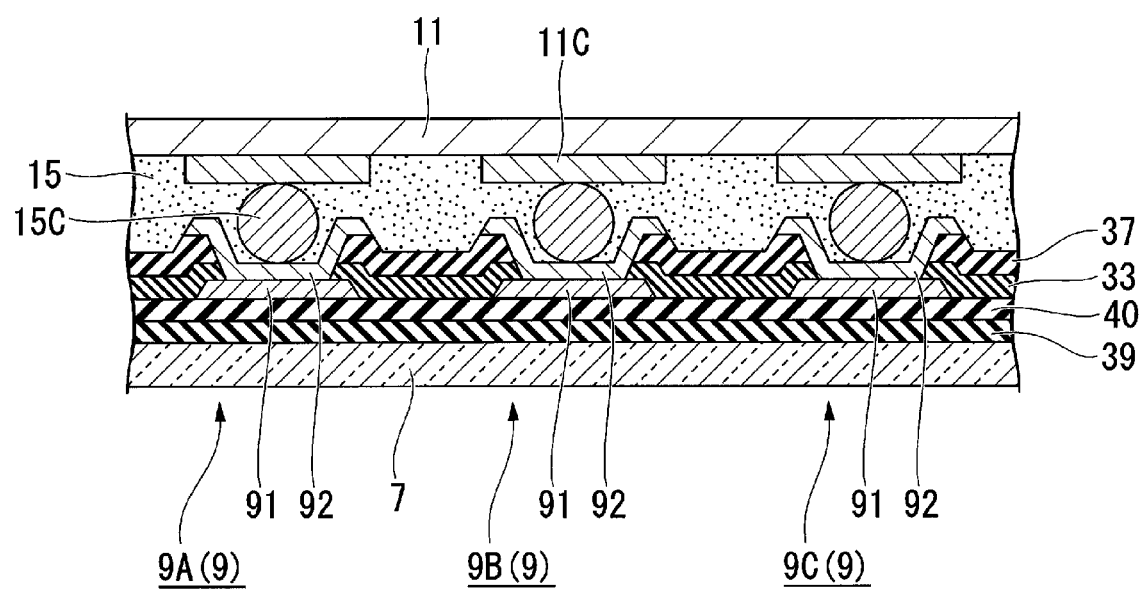
FIG. 5 is a sectional view taken along line V-V of FIG. 4.
Figure 6:
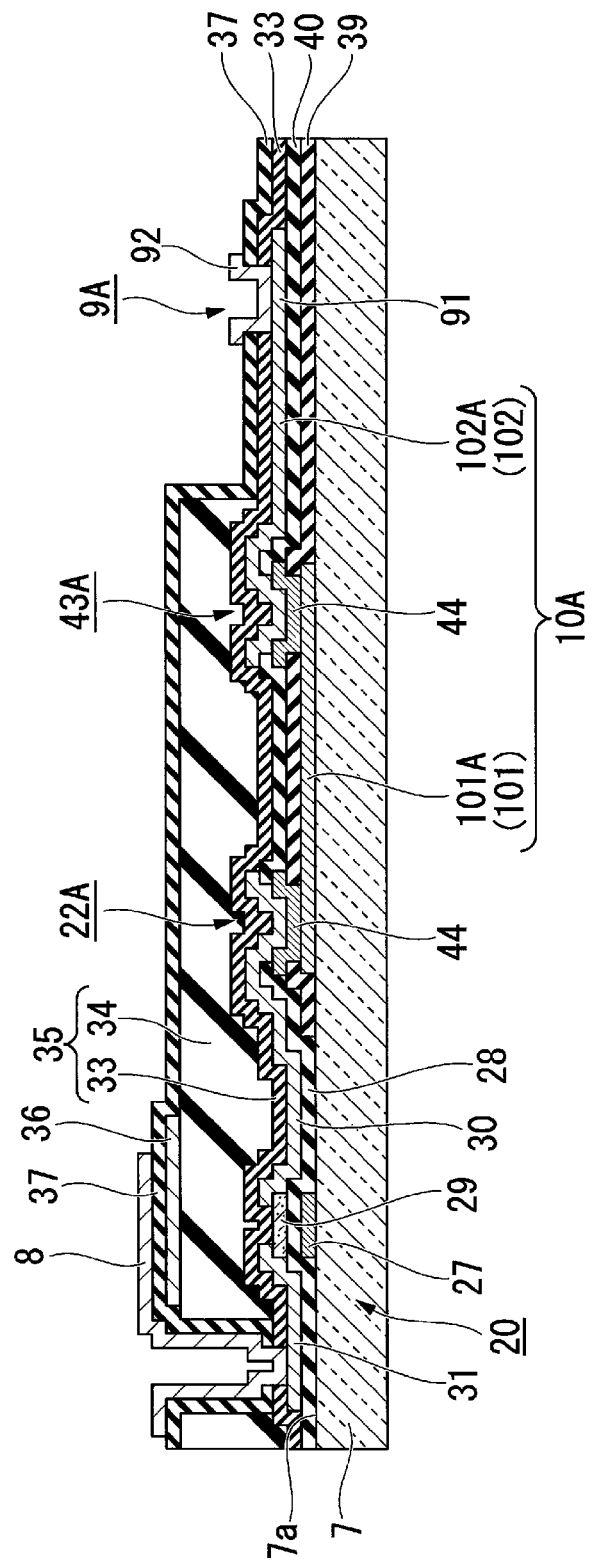
FIG. 6 is a sectional view taken along line VI-VI of FIG. 4.
Figure 7:
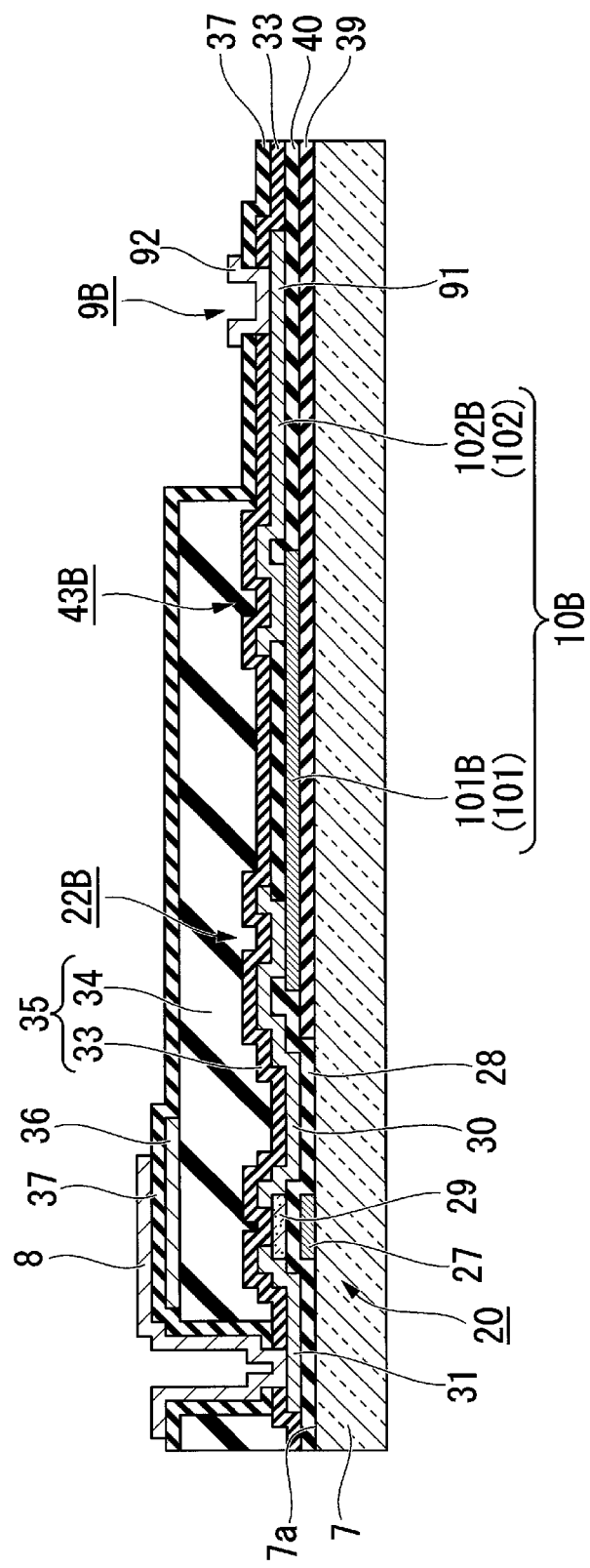
FIG. 7 is a sectional view taken along line VII-VII of FIG. 4.
Figure 8:
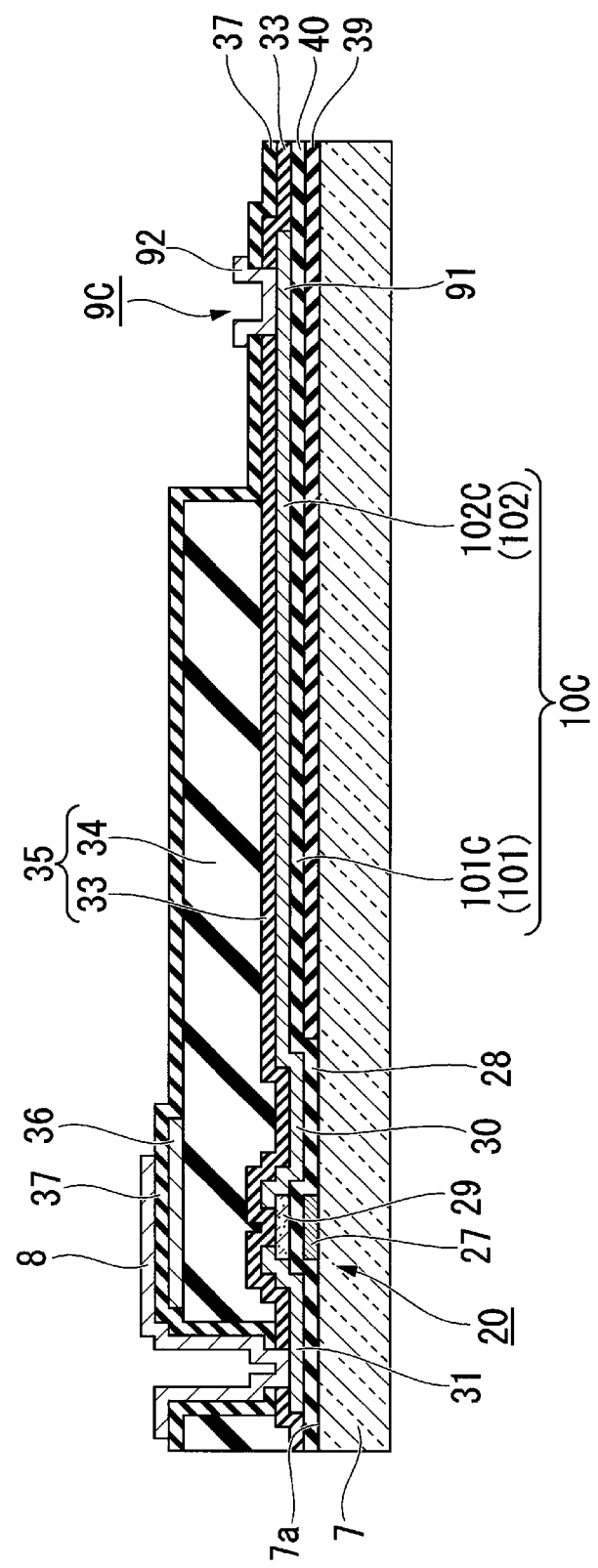
FIG. 8 is a sectional view taken along line VIII-VIII of FIG. 4.

FIG. 5 is a sectional view taken along line V-V of FIG. 4, which illustrates a sectional construction of three adjoining connection terminals 9. FIG. 6 is a sectional view taken along line VI-VI of FIG. 4, which illustrates a sectional construction of the first lead line 10A. FIG. 7 is a sectional view taken along line VII-VII of FIG. 4, which illustrates a sectional construction of the second lead line 10B. FIG. 8 is a sectional view taken along line VIII-VIII of FIG. 4, which illustrates a sectional construction of the third lead line 10C. Although the TFT 20 is, in fact, located at a position separate from the lead line 10 and the connection terminal 9, a sectional construction of the TFT 20 is illustrated in FIGS. 6 to 8 together with the sectional constructions of the lead line 10 and the connection terminal 9, so as to facilitate understanding of layer correspondence between the sectional constructions of the lead line 10 and the connection terminal 9, and the sectional construction of the TFT 20.

(Sectional Construction of Entire Device)

As illustrated in FIG. 2, the TFTs (not shown), the common electrode (not shown), the subpixel electrodes 8, and an alignment layer 24 are provided on the first surface 2a of the element substrate 2. On the other hand, the color filter 13, the black matrix 14, and an alignment layer 25 are provided on a first surface 3a of the counter substrate 3 opposing the element substrate 2. The color arrangement of the subpixels R, G, and B of the color filter 13 is not particularly limited. Further, an aspect of the present invention is also applicable to a display device that does not include the color filter 13.

In an aspect of the present invention, a display method employed in the liquid crystal display device 1 may be any one of a TN (twisted nematic) method, a VA (vertical alignment) method, a lateral electric field method, such as an IPS (in-plane switching) or FFS (fringe field switching) method, and the like. Although the display method used in the display device 1 is not particularly limited, it is assumed here that the present embodiment employs an FFS-type lateral electric field method as an example. Further, although the liquid crystal display device 1 includes a polarizer, a backlight unit, and the like in addition to the aforementioned component elements, such additional component elements are well known and thus are not described here. Furthermore, the liquid crystal display device 1 may also include a touch panel.

(Construction of TFT)

As illustrated in FIGS. 6 to 8, the TFT 20 includes a gate electrode 27, a gate insulating layer 28, a semiconductor layer 29, a source electrode 30, and a drain electrode 31. The gate electrode 27 is formed of a second conductive layer and provided on the first surface 7a of the first substrate 7. The gate insulating layer 28 is formed of a second insulating layer and provided over the entire surface of the first substrate 7 so as to cover the gate electrode 27. The semiconductor layer 29 is provided on the gate insulating layer 28. The source electrode 30 is formed of a third conductive layer and provided in contact with one end of the semiconductor layer 29. The drain electrode 31 is formed of the third conductive layer and provided in contact with the other end of the semiconductor layer 29. That is, the gate electrode 27, which is the lowest conductive layer among the plurality of conductive layers constituting the TFT 20, is formed of the second conductive layer.

Although not illustrated in FIGS. 6 to 8, the gate line 19 is formed integrally with the gate electrode 27, and the source line 18 is formed integrally with the source electrode 30. The TFT 20 in the present embodiment is a so-called bottom-gate TFT. Note, however, that a top-gate TFT may be employed as the switching element in the display device of an aspect of the present invention.

For example, a single-layer film of metal, such as aluminum, copper, titanium, molybdenum, or chromium, or a layered film of these metal materials, is used as the second conductive layer forming the gate electrode 27 and the gate line 19. Similarly, a single-layer film of metal, such as aluminum, copper, titanium, molybdenum, or chromium, or a layered film of these metal materials, is used as the third conductive layer forming the source line 18, the source electrode 30, and the drain electrode 31. An insulating layer, such as a silicon oxide film, a silicon nitride film, or the like, is used as the second insulating layer forming the gate insulating layer 28.

The TFT 20 is covered with a first passivation layer 35 formed of a layered film including an inorganic insulating layer 33 and an organic insulating layer 34. For example, an insulating layer, such as a silicon oxide film or a silicon nitride film, is used as the inorganic insulating layer 33. For example, an acrylic photosensitive resin is used as the organic insulating layer 34.

A common electrode 36, a second passivation layer 37, and the subpixel electrodes 8 are provided on or above the first passivation layer 35 in the mentioned order. A transparent conductive film formed, for example, of indium tin oxide (hereinafter abbreviated as ITO), or a reflective metal film formed, for example, of aluminum, platinum, or nickel may be used to form the common electrode 36 and the subpixel electrodes 8. An inorganic insulating layer or an organic insulating layer, similarly to the inorganic or organic insulating layer of the first passivation layer 35, is used as the second passivation layer 37.

(Construction of Lead Lines)

As illustrated in FIG. 4, the plurality of lead lines 10 include three types of lead lines, that is, the first lead lines 10A, the second lead lines 10B, and the third lead lines 10C.

Each of the first lead lines 10A includes a signal-line-side first lead line 101A and a connection-terminal-side first lead line 102A. The signal-line-side first lead line 101A is connected at one end to one of the source lines 18 and connected at the other end to the connection-terminal-side first lead line 102A.

The connection-terminal-side first lead line 102A is connected at one end to the signal-line-side first lead line 101A and connected at the other end to one of the connection terminals 9.

Each of the second lead lines 10B includes a signal-line-side second lead line 101B and a connection-terminal-side second lead line 102B. The signal-line-side second lead line 101B is connected at one end to another one of the source lines 18 and connected at the other end to the connection-terminal-side second lead line 102B.

The connection-terminal-side second lead line 102B is connected at one end to the signal-line-side second lead line 101B and connected at the other end to another one of the connection terminals 9.

Each of the third lead lines 10C includes a signal-line-side third lead line 101C and a connection-terminal-side third lead line 102C. The signal-line-side third lead line 101C is connected at one end to another one of the source lines 18 and connected at the other end to the connection-terminal-side third lead line 102C.

The connection-terminal-side third lead line 102C is connected at one end to the signal-line-side third lead line 101C and connected at the other end to another one of the connection terminals 9.

In the third lead line 10C, unlike in the first lead line 10A and the second lead line 10B, the signal-line-side third lead line 101C and the connection-terminal-side third lead line 102C are formed of the third conductive layer integrally with each other, as is described later. Thus, actually, the signal-line-side third lead line 101C and the connection-terminal-side third lead line 102C are not clearly distinguishable from each other. However, for convenience of description, a portion of the third lead line 10C located closer to the source line 18 (namely, an upper portion of the line 10C in FIG. 4) is referred to as "signal-line-side third lead line 101C" while a portion of the third lead line 10C located closer to the connection terminal 9 (namely, a lower portion of the line 10C in FIG. 4) is referred to as "connection-terminal-side third lead line 102C", with a portion near a section where relay contact sections, such as a first relay contact section 43A and a second relay contact section 43B that are described later, are provided regarded as a boundary between the lines 101C and 102C.

As illustrated in FIGS. 6 to 8, the signal-line-side first lead line 101A is formed of a first conductive layer provided on the first surface 7a of the first substrate 7. The signal-line-side second lead line 101B is formed of the second conductive layer provided on a first insulating layer 39 that covers the signal-line-side first lead line 101A. The signal-line-side third lead line 101C is formed of the third conductive layer provided on a second insulating layer 40 that covers the signal-line-side second lead line 101B. That is, the signal-line-side second lead line 101B is formed of the same second conductive layer as the gate electrode 27 and the gate line 19. The signal-line-side third lead line 101C is formed of the same third conductive layer as the drain electrode 31, the source electrode 30, and the source line 18.

In other words, the first conductive layer forming the signal-line-side first lead lines 101A is a conductive layer which is located below the second conductive layer forming the gate lines 19 and which is formed in a manufacturing step prior to the formation of the gate lines 19. Further, the first insulating layer 39 covering the signal-line-side first lead lines 101A is an insulting layer which is located below the second conductive layer forming the gate lines 19 and which is formed in a manufacturing step prior to the formation of the gate lines 19. A material similar to the material of the gate lines 19, such as a single-layer film of metal, such as aluminum, copper, titanium, molybdenum, or chromium, or a layered film of these metal materials, is used to form the first conductive layer. A material similar to the material of the gate insulating layer 28, such as a silicon oxide film or a silicon nitride film, is used to form the first insulating layer 39.

The connection-terminal-side first lead line 102A, the connection-terminal-side second lead line 102A, and the connection-terminal-side third lead line 102C are formed of conductive layers that include at least the third conductive layer but do not include the first conductive layer. In the present embodiment, all of the connection-terminal-side first lead line 102A, the connection-terminal-side second lead line 102B, and the connection-terminal-side third lead line 102C are formed of the third conductive layer provided on the second insulating layer 40 that covers the signal-line-side second lead line 101B.

In the first lead line 10A, as illustrated in FIG. 6, the signal-line-side first lead line 101A is formed of the first conductive layer, and the connection-terminal-side first lead line 102A is formed of the third conductive layer. That is, the signal-line-side first lead line 101A and the connection-terminal-side first lead line 102A are formed of conductive layers different from each other. Thus, the signal-line-side first lead line 101A and the connection-terminal-side first lead line 102A are electrically connected to each other via the first relay contact section 43A that extends through the first insulating layer 39 and the second insulating layer 40. More specifically, in the first relay contact section 43A, the signal-line-side first lead line 101A and the connection-terminal-side first lead line 102A are electrically connected to each other via a relay pad 44 formed of the second conductive layer. Note that the first lead line contact section 22A has a similar construction to the first relay contact section 43A.

In the second lead line 10B, as illustrated in FIG. 7, the signal-line-side second lead line 101B is formed of the second conductive layer, and the connection-terminal-side second lead line 102B is formed of the third conductive layer. That is, the signal-line-side second lead line 101B and the connection-terminal-side second lead line 102B are formed of conductive layers different from each other. Thus, the signal-line-side second lead line 101B and the connection-terminal-side second lead line 102B are electrically connected to each other via the second relay contact section 43B that extends through the second insulating layer 40. Note that the second lead line contact section 22B has a similar construction to the second relay contact section 43B.

In the third lead line 10C, as illustrated in FIG. 8, the signal-line-side third lead line 101C and the connection-terminal-side third lead line 102C are formed of the same third conductive layer. Thus, neither a relay contact section, such as the first relay contact section 43A and the second relay contact section 43B, nor a lead line contact section, such as the first lead line contact section 22A and the second lead line contact section 22B, is provided for the third lead line 10C.

(Construction of Connection Terminals)

In the following description, among the plurality of connection terminals 9, the connection terminal 9 connected to the first lead line 10A is referred to as a first connection terminal 9A, the connection terminal 9 connected to the second lead line 10B is referred to as a second connection terminal 9B, and the connection terminal 9 connected to the third lead line 10C is referred to as a third connection terminal 9C.

As illustrated in FIGS. 5 to 8, the first connection terminal 9A, the second connection terminal 9B, and the third connection terminal 9C have an identical construction.

That is, each of the first connection terminal 9A, the second connection terminal 9B, and the third connection terminal 9C has a two-layer structure that has: a lower-layer pad 91 formed of the third conductive layer integrally formed with the connection-terminal-side lead line 102; and an upper-layer pad 92 formed of a conductive layer that forms the subpixel electrode 8. The lower-layer pad 91 of each of the connection terminals 9 is formed of the same third conductive layer as each of the connection-terminal-side lead lines 102. That is, the lower-layer pad 91 of each of the connection terminals 9 and each of the connection-terminal-side lead lines 102 are formed integrally with each other. Further, the upper-layer pad 92 of each of the connection terminals 9 is formed of the same conductive layer as the subpixel electrode 8. The upper-layer pad 92 extends through the inorganic insulating layer 33 and the second passivation layer 37 into contact with the lower-layer pad 91.

Advantageous Effects of the Present Embodiment

The inventors have devised, prior to the liquid crystal display device according to the present embodiment, a liquid crystal display device that is described below as a comparative example of a liquid crystal display device.

Figure 14:
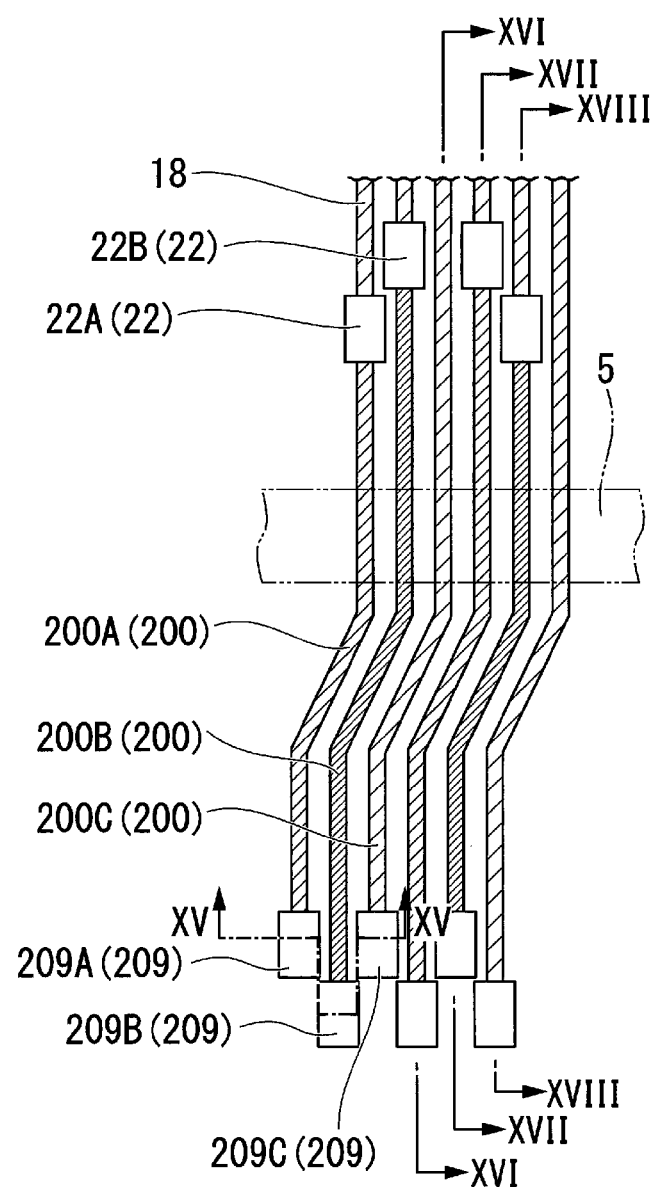
FIG. 14 is an enlarged view illustrating a lead wiring section and a connection terminal section provided in a comparative example of a liquid crystal display device.
Figure 15:
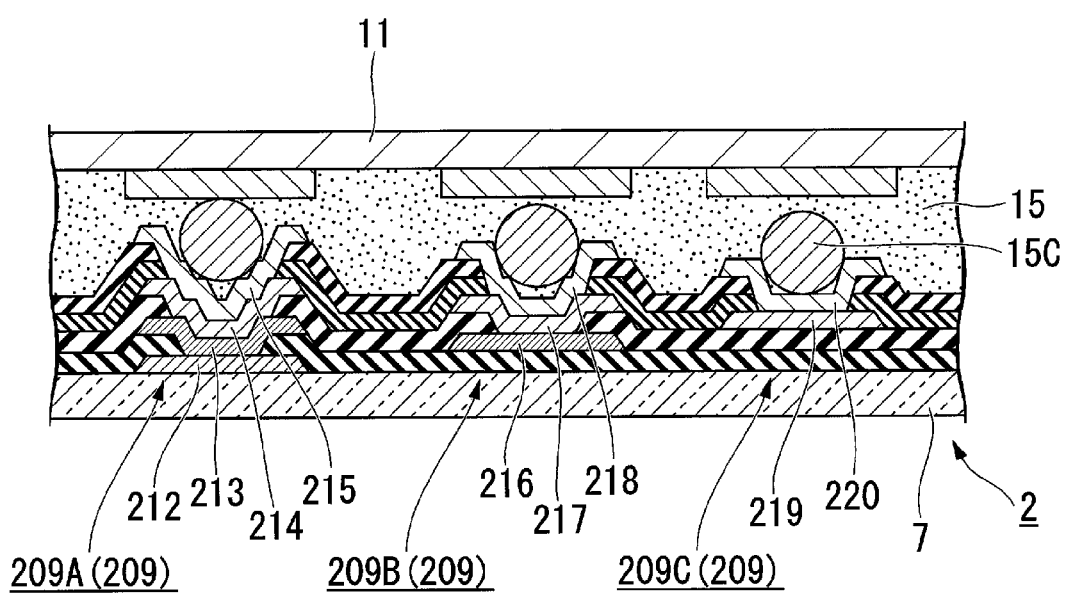
FIG. 15 is a sectional view taken along line X-X of FIG. 14.
Figure 16:
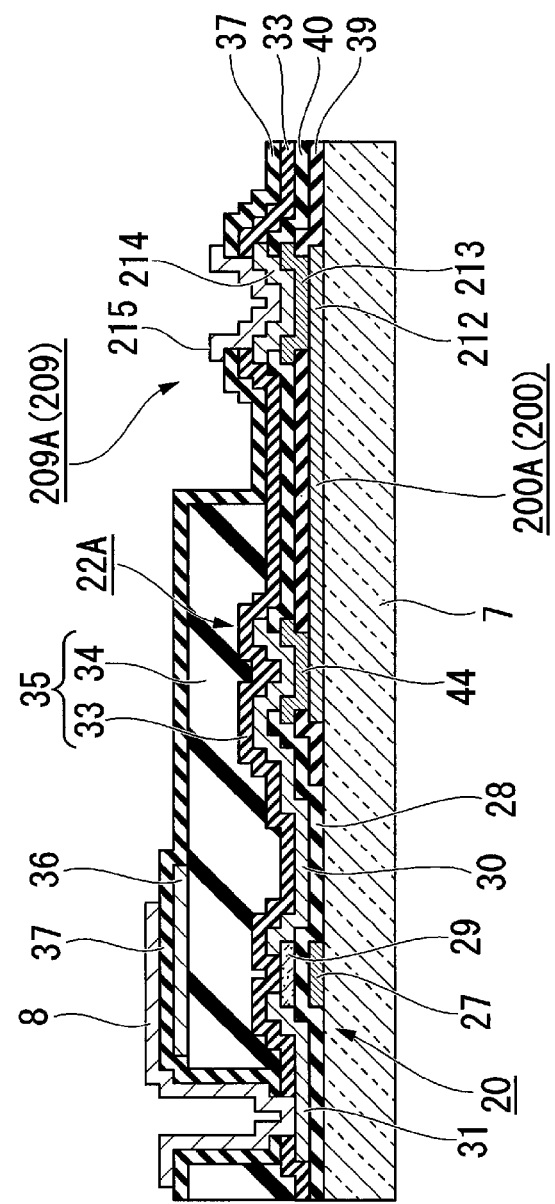
FIG. 16 is a sectional view taken along line XI-XI of FIG. 14.
Figure 17:
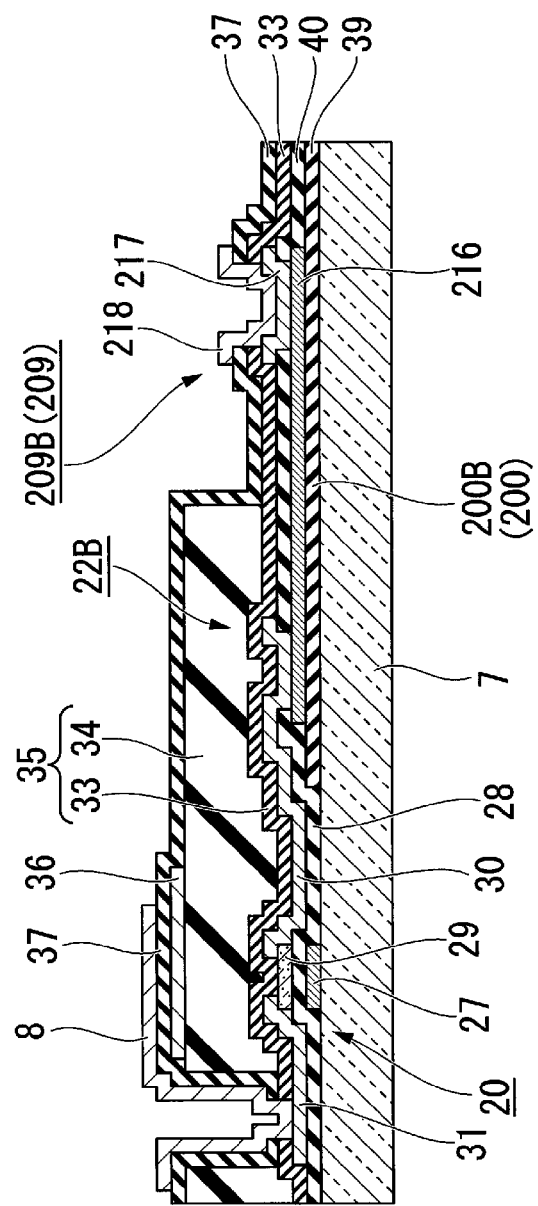
FIG. 17 is a sectional view taken along line XII-XII of FIG. 14.
Figure 18:
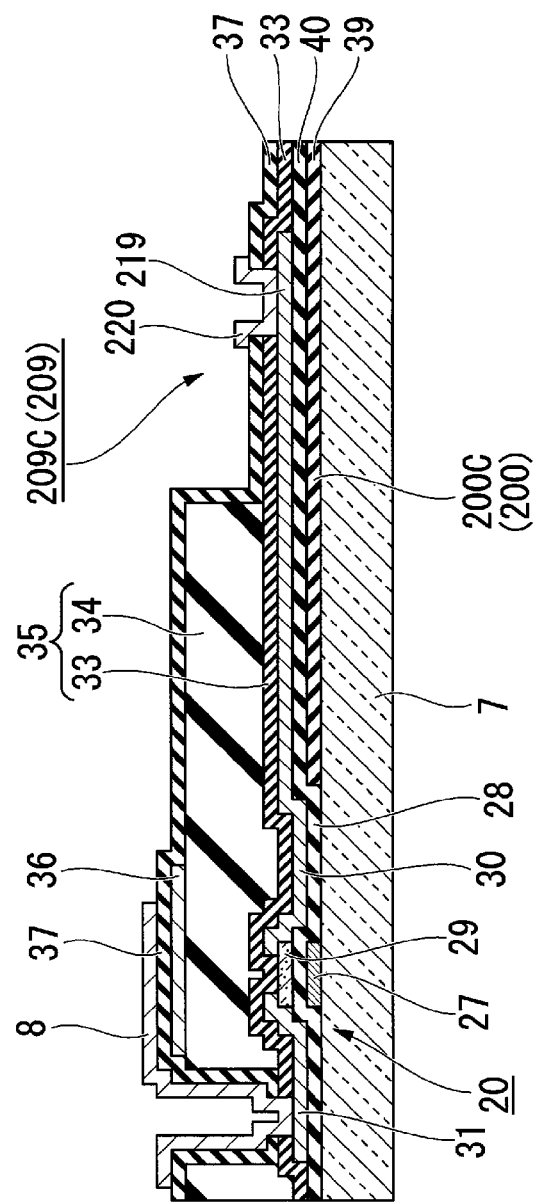
FIG. 18 is a sectional view taken along line XIII-XIII of FIG. 14.

FIG. 14 is an enlarged view illustrating lead wiring and connection terminals of the comparative example of the liquid crystal display device. FIG. 15 is a sectional view taken along line X-X of FIG. 14. FIG. 16 is a sectional view taken along line XI-XI of FIG. 14. FIG. 17 is a sectional view taken along line XII-XII of FIG. 14. FIG. 18 is a sectional view taken along line XIII-XIII of FIG. 14. In FIGS. 14 to 18, the same component elements as in FIGS. 4 to 8 illustrating the present embodiment are denoted by the same reference numerals and characters as in FIGS. 4 to 8, and such same component elements are not described here.

In the comparative example of the liquid crystal display device, as illustrated in FIG. 14, a plurality of lead lines 200 include three types of lead lines, that is, first lead lines 200A, second lead lines 200B, and third lead lines 200C.

As illustrated in FIG. 16, each of the first lead lines 200A is formed of the first conductive layer provided on the first surface 7a of the first substrate 7. As illustrated in FIG. 17, each of the second lead lines 200B is formed of the second conductive layer provided on the first insulating layer 39.

Further, as illustrated in FIG. 18, each of the third lead lines 200C is formed of the third conductive layer provided on the second insulating layer 40.

That is, the first lead line 200A is formed of the first conductive layer located below the conductive layer forming the TFT. The second lead line 200B is formed of the same second conductive layer as the gate electrode 27 and the gate line 19. The third lead line 200C is formed of the same third conductive layer as the drain electrode 31, the source electrode 30, and the source line 18.

However, desired reduction of the width of and the interval between the lead lines may be limited due to manufacturing-process-related restraints. Thus, liquid crystal display devices of the related art, where all lead lines are formed of an identical conductive layer, require a wide space for arranging the lead lines, thereby presenting the problem of a picture-frame region having an increased size.

By contrast, in the above-described comparative example, the plurality of lead lines 200 include the first lead lines 200A, the second lead lines 200B, and the third lead lines 200C that are formed of conductive layers different from each other. Thus, an arrangement density of the lead lines 200 per unit area as viewed in the direction normal to the substrate may increase in the comparative example, and the picture-frame region of the liquid crystal device may be narrowed. Further, because the first lead lines 200A are formed of the first conductive layer located apart from the liquid crystal layer, an unintended voltage and/or parasitic capacitance is less likely to be produced. As a result, the comparative example can suppress deterioration of the display quality.

However, in the above-described comparative example, where the plurality of lead lines 200 are formed of three different conductive layers, the first connection terminal 209A connected to the first lead line 200A, the second connection terminal 209B connected to the second lead line 200B, and the third connection terminal 209C connected to the third lead line 200C have different layered structures from each other, as illustrated in FIGS. 15 to 18.

That is, the first connection terminal 209A has a layered structure having four layers of pads: a first pad 211 formed of the first conductive layer; a second pad 212 formed of the second conductive layer; a third pad 213 formed of the third conductive layer; and a fourth pad 214 formed of the conductive layer forming the subpixel electrode 8.

The second connection terminal 209B has a layered structure having three layers of pads: a first pad 216 formed of the second conductive layer; a second pad 217 formed of the third conductive layer; and a third pad 218 formed of the conductive layer forming the subpixel electrode 8. The third connection terminal 209C has a layered structure having two layers of pads: a first pad 219 formed of the third conductive layer; and a second pad 220 formed of the conductive layer forming the subpixel electrode 8.

Because of the aforementioned different layered structures, the first connection terminal 209A, the second connection terminal 209B, and the third connection terminal 209C have upper surface heights different from each other. Particularly, in the above-described comparative example, the height differences among the connection terminals further increase, because the lead lines are formed using the conductive layers located below the TFT so as to reduce influences on the liquid crystal layer. As a consequence, when the semiconductor chip 11 for a driver is pressure-bonded to the element substrate 2 using the ACF 15, a degree of collapse of conductive particles 15C of the ACF 15 differs among the connection terminals 209, which may lead to unwanted pressure-bonding defects.

By contrast, in the case of the liquid crystal display device 1 according to the present embodiment, portions of all of the lead lines 10 closer to the contact terminals 9 are formed of only the third conductive layer as the connection-terminal-side lead lines 102, as illustrated in FIGS. 5 to 8. Further, as illustrated in FIG. 5, all of the connection terminals 9 have the same construction and the same upper surface height. Thus, when the semiconductor chip 11 for a driver is pressure-bonded to the element substrate 2 using the ACF 15, a degree of collapse of the conductive particles 15C of the ACF 15 can be made substantially uniform among all of the connection terminals 9. As a result, electrodes 11C of the semiconductor chip 11 for a driver and all of the connection terminals 9 can be uniformly bonded together via the conductive particles 15C. In this way, the liquid crystal display device 1 according to the present embodiment can reduce an occurrence rate of pressure-bonding defects as compared with the comparative example of the liquid crystal display device.

Further, in the liquid crystal display device 1 according to the present embodiment, the plurality of lead lines 10 include the signal-line-side first lead lines 101A, the signal-line-side second lead lines 101B, and the signal-line-side third lead lines 101C which are formed of different conductive layers. That is, if only the signal-line-side first lead lines 101A, the signal-line-side second lead lines 101B, and the signal-line-side third lead lines 101C are considered, the liquid crystal display device 1 according to the present embodiment has a similar construction to the comparative example. Thus, the present embodiment can increase the arrangement density of the lead lines 10 per unit area, and the picture-frame region of the liquid crystal device may be narrowed. Furthermore, because the plurality of lead lines 10 include the signal-line-side first lead lines 10A formed of the first conductive layer located apart from the liquid crystal layer 4, an unintended voltage and/or parasitic capacitance is less likely to be produced. As a result, the liquid crystal display device according to the present embodiment can suppress deterioration of the display quality.

Referring to FIG. 4, a ratio in length between the signal-line-side lead line 101 and the connection-terminal-side lead line 102 in each of the lead lines 10 is not particularly limited. However, in the case of the present embodiment, if the connection-terminal-side lead lines 102 formed of the same conductive layer are excessively long, it may become difficult to achieve the merit of the reduced pitch between the lead lines through the construction where the signal-line-side lead lines 101 are formed of three conductive layers. From this viewpoint, it is desirable that the signal-line-side lead lines 101 be at least longer than the connection-terminal-side lead lines 102.

Second Embodiment

Next, a second embodiment of the present invention is described with reference to FIGS. 9 to 13.

A liquid crystal display device according to the second embodiment has substantially the same construction as the above-described first embodiment, but differs from the first embodiment in terms of the construction of the lead lines. Thus, in the second embodiment, only the lead lines are described.

Figure 9:
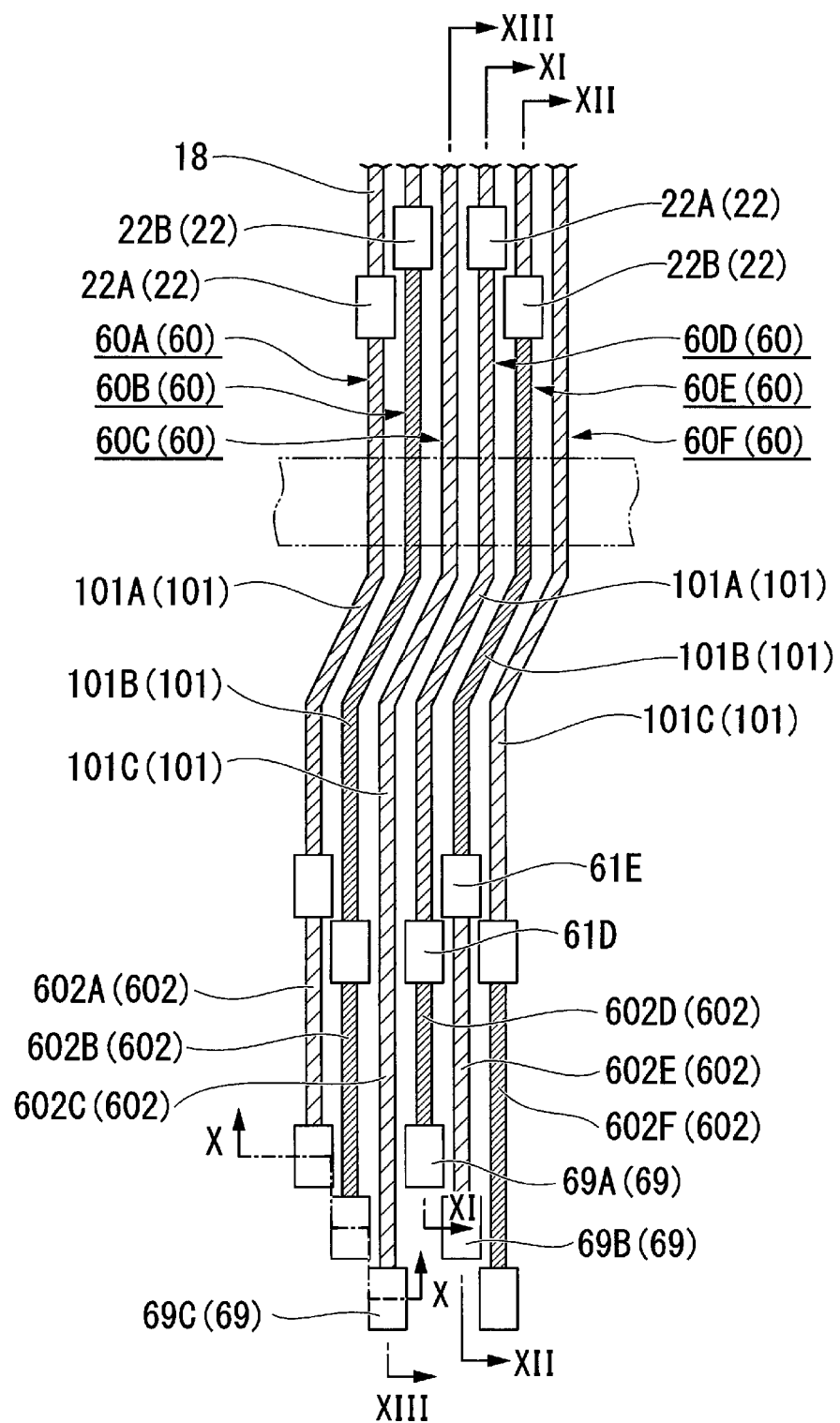
FIG. 9 is an enlarged view illustrating a lead wiring section and a connection terminal section provided in a liquid crystal display device according to a second embodiment.
Figure 10:
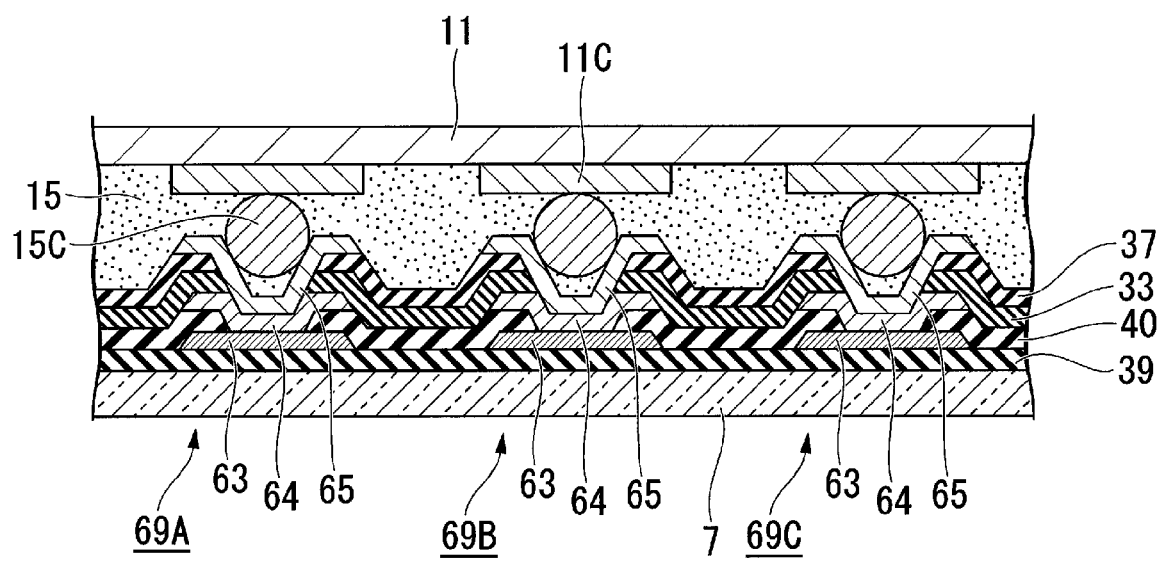
FIG. 10 is a sectional view taken along line X-X of FIG. 9.
Figure 11:
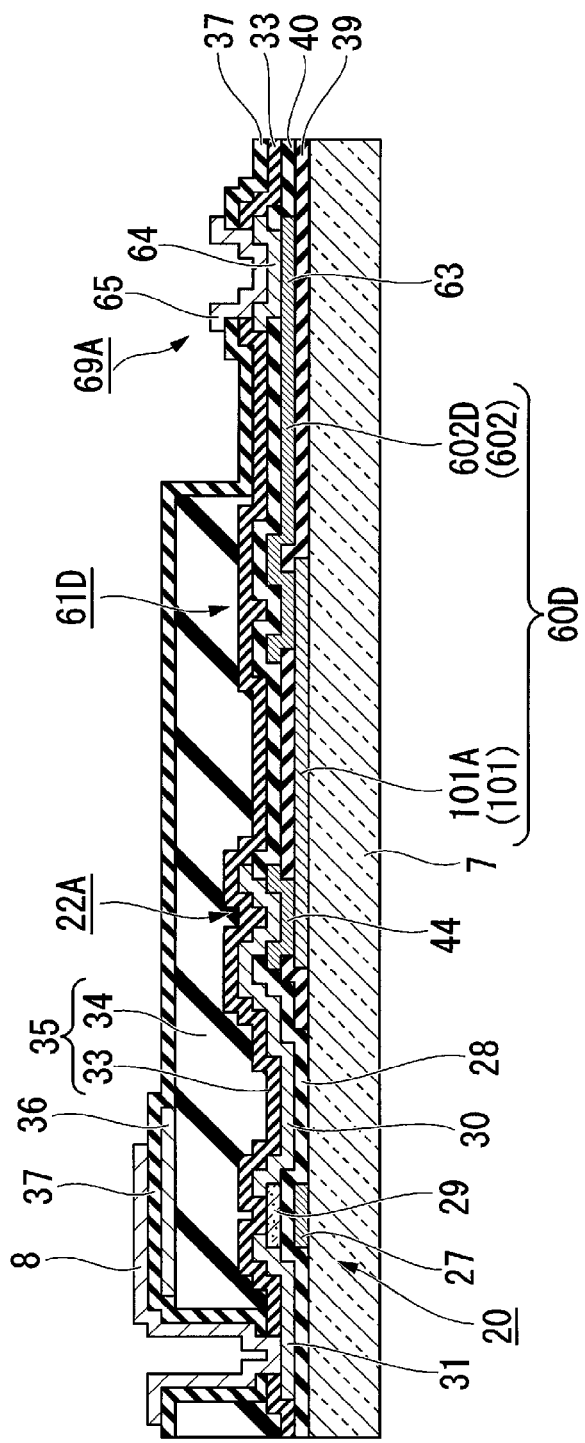
FIG. 11 is a sectional view taken along line XI-XI of FIG. 9.
Figure 12:
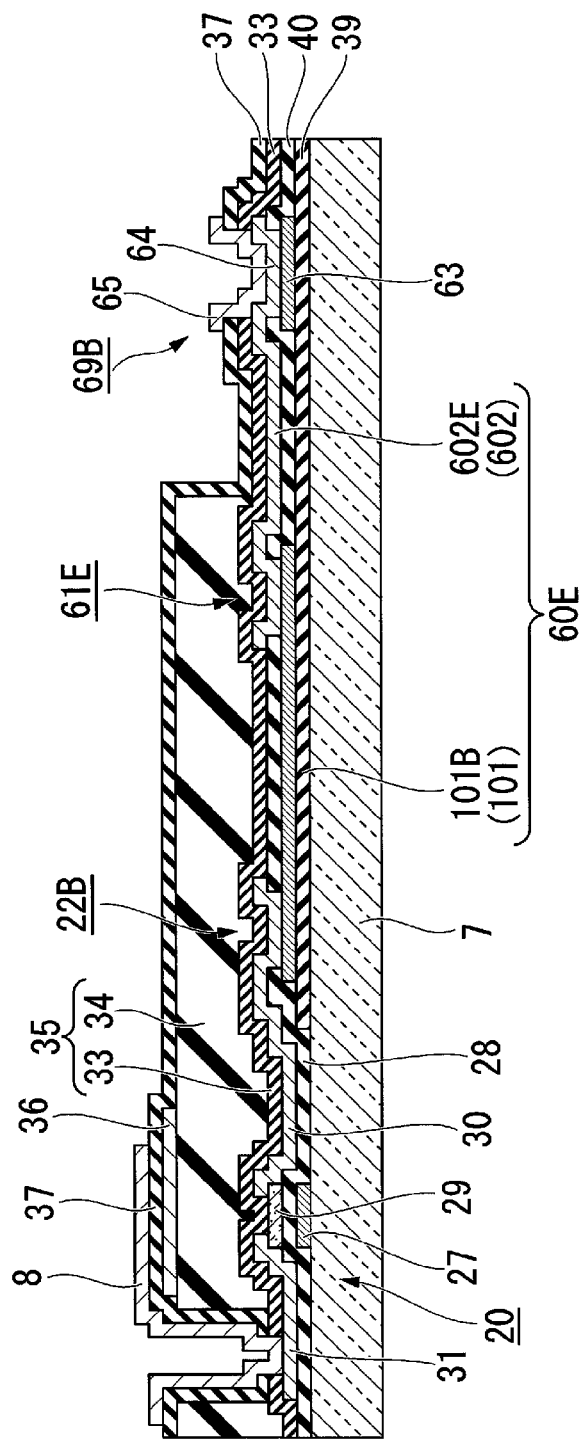
FIG. 12 is a sectional view taken along line XII-XII of FIG. 9.
Figure 13:
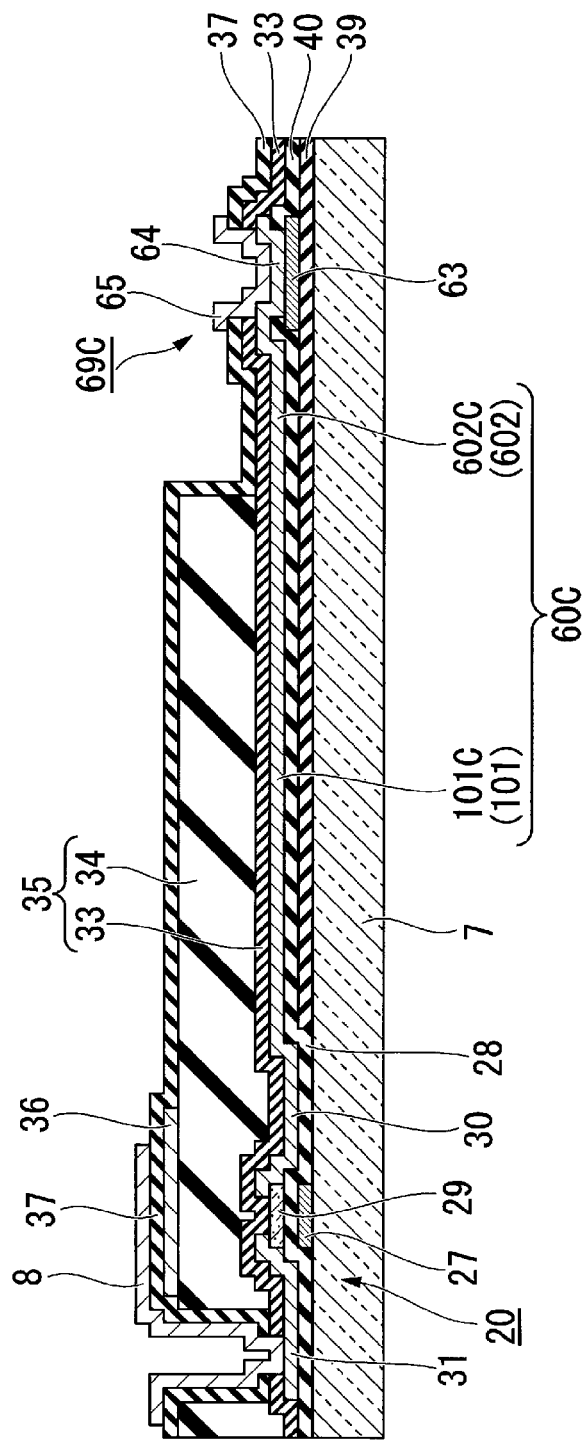
FIG. 13 is a sectional view taken along line XIII-XIII of FIG. 9.

FIG. 9 is an enlarged view illustrating the lead wiring provided in the liquid crystal display device according to the second embodiment. FIG. 10 is a sectional view taken along line X-X of FIG. 9. FIG. 11 is a sectional view taken along line XI-XI of FIG. 9. FIG. 12 is a sectional view taken along line XII-XII of FIG. 9. FIG. 13 is a sectional view taken along line XIII-XIII of FIG. 9.

In FIGS. 9 to 13, the same component elements as in the figures illustrating the first embodiment are denoted by the same reference numerals and characters as in the figures illustrating the first embodiment, and such same component elements are not described here.

(Construction of Lead Lines)

In the above-described first embodiment, all of the plurality of connection-terminal-side lead lines 102 are formed of the third conductive layer. By contrast, in the second embodiment, the plurality of connection-terminal-side lead lines 602 are formed of the second or third conductive layer, as illustrated in FIG. 9.

In the following description, each lead line 60 including the signal-line-side lead line 101 formed of the first conductive layer is referred to as a first lead line 60A, each lead line 60 including the signal-line-side lead line 101 formed of the second conductive layer is referred to as a second lead line 60B, and each lead line 60 including the signal-line-side lead line 101 formed of the third conductive layer is referred to as a third lead line 60C.

More specifically, the first lead line 60A includes the signal-line-side first lead line 101A and the connection-terminal-side first lead line 602A. The second lead line 60B includes the signal-line-side second lead line 101B and the connection-terminal-side second lead line 602B. The third lead line 60C includes the signal-line-side third lead line 101C and the connection-terminal-side third lead line 602C. The signal-line-side first lead line 101A, the signal-line-side second lead line 101B, and the signal-line-side third lead line 101C have similar constructions to those of the first embodiment.

The connection-terminal-side first lead line 602A, the connection-terminal-side second lead line 602B, and the connection-terminal-side third lead line 602C are constructed such that the second conductive layer and the third conductive layer are arranged alternately across the plurality of connection-terminal-side lead lines 602. For example, the first lead line 60A that is the leftmost lead line in FIG. 9 includes the connection-terminal-side first lead line 602A formed of the third conductive layer. The second lead line 602B that is the second lead line from the left includes the connection-terminal-side first lead line 602B formed of the second conductive layer. The third lead line 60C that is the third lead line from the left includes the connection-terminal-side third lead line 602C formed of the third conductive layer. The first lead line 60D that is the fourth lead line from the left includes the connection-terminal-side first lead line 602D formed of the second conductive layer. The second third lead line 60E that is the fifth lead line from the left includes the connection-terminal-side second lead line 602E formed of the third conductive layer. Further, the third lead line 60F that is the rightmost lead line in FIG. 9 includes the connection-terminal-side third lead line 602F formed of the second conductive layer. Such an alternate arrangement repeats following the third lead line 60F.

As illustrated in FIG. 11, in the first lead line 60D that is the fourth lead line from the left in FIG. 9, the signal-line-side first lead line 101A formed of the first conductive layer and the connection-terminal-side first lead line 602D formed of the second conductive layer are connected to each other via a first relay contact section 61D.

As illustrated in FIG. 12, in the second lead line 60E that is the fifth lead line from the left in FIG. 9, the signal-line-side second lead line 101B formed of the second conductive layer and the connection-terminal-side second lead line 602E formed of the third conductive layer are connected to each other via a second relay contact section 61E.

As illustrated in FIG. 13, in the third lead line 60C that is the third lead line from the left in FIG. 9, the signal-line-side third lead line 101C formed of the third conductive layer and the connection-terminal-side third lead line 602C formed of the third conductive layer are formed integrally with each other.

The second embodiment is similar to the first embodiment in terms of the other structural features.

(Construction of Connection Terminals)

As illustrated in FIGS. 10 to 13, the first connection terminal 9A, the second connection terminal 9B, and the third connection terminal 9C have an identical construction. That is, each of the first connection terminal 9A, the second connection terminal 9B, and the third connection terminal 9C has a three-layer structure that has a lower-layer pad 63 formed of the second conductive layer, an intermediate pad 64 formed of the third conductive layer, and an upper-layer pad 65 formed of the conductive layer forming the subpixel electrode 8.

As illustrated, for example, in FIG. 11, in the first lead line 60D, a portion of the connection-terminal-side first lead line 602D extends to a portion of the first connection terminal 69A, and such extending portion of the lead line 602D forms the lower-layer pad 63 integrally with the connection-terminal-side first lead line 602D. Further, as illustrated in FIG. 12 or FIG. 13, in each of the lead lines 60C and 60E including respective connection-terminal-side lead lines 602 formed of the third conductive layer, an isolated pattern of the second conductive layer is provided below the connection-terminal-side lead line 602C or 602E in a portion of the connection terminal 69C or 69B, and such isolated pattern forms the lower-layer pad 63.

The second embodiment achieves the same advantageous effect, as achieved by the first embodiment, of being capable of providing a liquid crystal display device in which the picture-frame region is narrowed while deterioration of the display quality is suppressed. Besides, because all of the connection terminals 69 have the same structure and the same upper surface height, the second embodiment achieves the same advantageous effect, as achieved by the first embodiment, of being capable of reducing the occurrence rate of pressure-bonding defects.

However, in the case of the first embodiment, where all of the plurality of connection-terminal-side lead lines 102 are formed of the same conductive layer, design freedom of the lead lines 10 tends to be lowered depending on a degree of desired reduction of the pitch between the lead lines, and thus, the desired reduction of the pitch tends to be difficult to achieve. In the case of the second embodiment, on the other hand, the plurality of connection-terminal-side lead lines 602 are constructed such that the second conductive layer and the third conductive layer are arranged alternately, and thus, the lead lines can be arranged at a density that is substantially two times as high as in the first embodiment, as long as the width of and pitch between the lead lines are the same as in the first embodiment. Therefore, the second embodiment can enhance the design freedom of the lead lines and thus achieve the reduction of the pitch between the lead lines as compared with the first embodiment.

It should be appreciated that the technical scope of the present invention is not limited to the above-described embodiments and various modifications of the embodiments are possible without departing from the spirit of the present invention.

For example, the first embodiment has been described above in relation to the case in which all of the connection-terminal-side lead lines are formed of the third conductive layer, and the second embodiment has been described above in relation to the case in which the plurality of connection-terminal-side lead lines are formed of the second conductive layer and the third conductive layer. As an alternative to such constructions, all of the connection-terminal-side lead lines may be formed, for example, of the second conductive layer.

Further, in the second embodiment, the lower-layer pads 63, each having the isolated pattern of the second conductive layer, need not necessarily be provided in the lead lines 60C and 60E including the connection-terminal-side lead lines 602 formed of the third conductive layer, so as to form the connection terminals 69C and 69B. In this case, because not all of the connection terminals have the same construction, the connection terminal for the connection-terminal-side lead line formed of the third conductive layer and the connection terminal for the connection-terminal-side lead line formed of the second conductive layer have different constructions, and thus, not all of the connection terminals have the same upper surface height. However, in such a case also, the second embodiment can alleviate the height differences among the connection terminals and thereby reduce the pressure-bonding detects as compared with the comparative example illustrated in FIG. 15.

Although the embodiments have been described above in relation to the case in which the lead lines in an aspect of the present invention are used as source lead-out lines, the present invention is not limited thereto, and the lead lines in an aspect of the present invention may be used as gate lead-out lines. Further, though the embodiments have been described above in relation to the case in which the semiconductor chip for a driver is connected to the connection terminals, the electronic component part connected to the connection terminals is not limited to the semiconductor chip for a driver and may be a flexible printed wiring board. It should also be appreciated that the specific descriptions pertaining to shapes, numbers, positions, materials, and the like of the individual component elements of the liquid crystal display devices according to the embodiments may be modified as necessary.

INDUSTRIAL APPLICABILITY

According to an aspect of the present invention, the present invention can be applied not only as a liquid crystal display device, but also as various other display devices, such as an organic electro-luminescence display device and an electrophoretic display device.

REFERENCE SIGNS LIST 1 liquid crystal display device (display device), 2 element substrate, 3 counter substrate, 4 liquid crystal layer (electro-optical material layer), 7 first substrate, 9, 69 connection terminal, 9A, 69A first connection terminal, 9B, 69B second connection terminal, 9C, 69C third connection terminal, 10, 60 lead line, 10A, 60A, 60D first lead line, 10B, 60B, 60E second lead line, 10C, 60C, 60F third lead line, 18 source line (signal line), 20 thin film transistor (switching element), 101 signal-line-side lead line, 101A signal-line-side first lead line, 101B signal-line-side second lead line, 101C signal-line-side third lead line, 102, 602 connection-terminal-side lead line, 102A, 602A, 602D connection-terminal-side first lead line, 102B, 602B, 602E connection-terminal-side second lead line, 102C, 602C, 602F connection-terminal-side third lead line

The invention claimed is:

1. A display device comprising:
a first substrate;
an electro-optical material layer provided on a first surface of the first substrate;
a plurality of signal lines provided on the first surface;
a plurality of switching elements provided on the first surface;
a plurality of connection terminals provided on the first surface; and
a plurality of lead lines extending in a first direction along the first surface and electrically connecting at least some of the plurality of signal lines and at least some of the plurality of connection terminals,
wherein the plurality of lead lines include a first lead line, a second lead line, and a third line that are arranged sequentially in a second direction perpendicular to the first direction in plan view as viewed in a direction normal to the first surface,
the first lead line includes a signal-line-side first lead line connected at one end to one of the signal lines, and a connection-terminal-side first lead line connected at one end to the signal-line-side first lead line and connected at another end to one of the connection terminals,
the second lead line includes a signal-line-side second lead line connected at one end to another one of the signal lines, and a connection-terminal-side second lead line connected at one end to the signal-line-side second lead line and connected at another end to another one of the connection terminals, and
the third lead line includes a signal-line-side third lead line connected at one end to another one of the signal lines, and a connection-terminal-side third line connected at one end to the signal-line-side third lead line and connected at another end to another one of the connection terminals,
wherein the signal-line-side first lead line is formed of a first conductive layer provided on the first surface,
the signal-line-side second lead line is formed of a second conductive layer provided on a first insulating layer covering the first lead line, and
the signal-line-side third lead line is formed of a third conductive layer provided on a second insulating layer covering the second lead line,
wherein a lowest conductive layer among a plurality of conductive layers forming the switching elements is formed of the second conductive layer, and
wherein among the plurality of lead lines, the connection-terminal-side first lead line, the connection-terminal-side second lead line, and the connection-terminal-side third lead line are formed of conductive layers that include at least the third conductive layer but do not include the first conductive layer.

2. The display device according to claim 1, wherein each of the connection-terminal-side first lead line, the connection-terminal-side second lead line, and the connection-terminal-side third lead line is formed of the third conductive layer.

3. The display device according to claim 1, wherein the connection-terminal-side first lead line, the connection-terminal-side second lead line, and the connection-terminalside third lead line are constructed such that the second conductive layer and the third conductive layer are arranged alternately across the plurality of lead lines.

4. The display device according to claim 3, wherein the connection terminals connected respectively to the connection-terminal-side first lead line, the connection-terminal-side second lead line, and the connection-terminal-side third lead line are constructed such that the second conductive layer and the third conductive layer are layered.

5. The display device according to claim 1, wherein each of the switching elements is a thin film transistor,
the plurality of signal lines include a plurality of gate lines and a plurality of source lines, and
the lead lines electrically connect the source lines and the connection terminals.

6. The display device according to claim 5, wherein a gate electrode of the thin film transistor is formed of the second conductive layer.

* * * * *